United States Patent
Swearingen et al.

(10) Patent No.: US 7,659,329 B2
(45) Date of Patent: Feb. 9, 2010

(54) REMOVING FLUOROSURFACTANT FROM AQUEOUS FLUOROPOLYMER DISPERSIONS USING MONODISPERSE ION EXCHANGE RESIN

(75) Inventors: Steven H. Swearingen, Wilmington, DE (US); William George O'Brien, Newark, DE (US); Charles Joseph Noelke, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 610 days.

(21) Appl. No.: 11/292,459

(22) Filed: Dec. 2, 2005

(65) Prior Publication Data

US 2006/0135654 A1    Jun. 22, 2006

Related U.S. Application Data

(60) Provisional application No. 60/638,324, filed on Dec. 22, 2004.

(51) Int. Cl.
 *C08F 6/16* (2006.01)
(52) U.S. Cl. ..................................... 523/310
(58) Field of Classification Search .................. 523/310
 See application file for complete search history.

(56) References Cited

U.S. PATENT DOCUMENTS

| | | | |
|---|---|---|---|
| 2,559,752 A | 7/1951 | Berry | |
| 3,037,953 A | 6/1962 | Marks et al. | |
| 3,704,272 A | 11/1972 | Holmes | |
| 3,882,153 A | 5/1975 | Seki et al. | |
| 4,282,162 A | 8/1981 | Kuhls | |
| 4,369,266 A | 1/1983 | Kuhls et al. | |
| 4,380,618 A | 4/1983 | Khan et al. | |
| 6,153,688 A | 11/2000 | Miura et al. | |
| 6,825,250 B2 | 11/2004 | Epsch et al. | |
| 6,833,403 B1 | 12/2004 | Bladel et al. | |
| 6,861,466 B2 | 3/2005 | Dadalas et al. | |
| 7,297,744 B2 * | 11/2007 | Kapeliouchko et al. | ..... 524/544 |
| 2003/0125421 A1 | 7/2003 | Bladel et al. | |
| 2004/0143052 A1 | 7/2004 | Epsch et al. | |
| 2004/0186219 A1 | 9/2004 | Dadalas et al. | |
| 2006/0036021 A1 | 2/2006 | Noelke et al. | |

FOREIGN PATENT DOCUMENTS

| EP | 1 155 055 B1 | 4/2003 |
|---|---|---|
| WO | WO 00/35971 | 6/2000 |
| WO | WO 2006/020721 A1 | 2/2006 |

OTHER PUBLICATIONS

Amberjet 4400 OH, Rohm Haas, Product Data Sheet (2000).*

* cited by examiner

*Primary Examiner*—Edward J Cain

(57) ABSTRACT

A process for reducing fluorosurfactant content of a stabilized fluorosurfactant-containing aqueous fluoropolymer dispersion comprising passing said stabilized fluorosurfactant-containing aqueous fluoropolymer dispersion through a fixed bed of ion exchange resin beads comprising a polymer and functional groups to reduce fluorosurfactant content, the ion exchange resin beads being monodisperse.

14 Claims, No Drawings

REMOVING FLUOROSURFACTANT FROM AQUEOUS FLUOROPOLYMER DISPERSIONS USING MONODISPERSE ION EXCHANGE RESIN

FIELD OF THE INVENTION

This invention relates to a process for removing fluorosurfactant from aqueous fluoropolymer dispersions using ion exchange resin.

BACKGROUND OF THE INVENTION

Fluorosurfactants are typically used as a polymerization aid in the dispersion polymerization of fluoropolymers, the fluorosurfactants functioning as a non-telogenic dispersing agent. For example, an early description of this use of fluorosurfactants is found in U.S. Pat. No. 2,559,752 (Berry). Because of environmental concerns and because fluorosurfactants are expensive, processes have been developed for their recovery from waste water and from aqueous fluoropolymer dispersions.

One method for removal of fluorosurfactants from fluoropolymer dispersions is disclosed in U.S. Pat. No. 4,369,266 and includes the addition of a stabilizing surfactant followed by concentration by ultrafiltration. This patent teaches that a high proportion of the fluorosurfactant can be removed via the aqueous permeate. It is also known to remove fluorosurfactant by adsorption onto an ion exchange resin as taught in U.S. Pat. No. 3,882,153 (Seki et al) and U.S. Pat. No. 4,282,162 (Kuhls). Kuhls teaches recovery of fluorinated emulsifiers dissolved in the aqueous phase after coagulation of the polymer from the dispersion or in aqueous polymer dispersions to be concentrated. US 2003/0125421 A1 (Bladel et al.) also teaches removal of fluorine-containing emulsifiers from fluoropolymer dispersion by contacting with an anion exchanger.

Known processes using anion exchange resins for the removal of fluorosurfactant from fluoropolymer dispersions employ either strongly basic anion exchange resins or weakly basic anion exchange resins. However, the resins employed have had a broad Gaussian or conventional distribution of bead sizes about the average bead diameter. Thus, conventional resin beads range in size from 16 to 50 mesh, or 1200 to 300 microns. For example, Bladel et al. teaches to the use of a resin sold by Rohm and Haas under the trademark AMBERLITE® 402 which is known to have the a conventional 16-50 mesh particle size particle distribution for anion exchange resins of this type.

Anion exchange resin beads with the conventional bead size distribution typically have very large beads which become increasingly fragile as they get larger and are prone to breakage. Breakage can result in fine particles which may contaminate the dispersion being treated and/or produce larger broken particles with jagged edges. When a fixed anion exchange bed is employed, anion exchange beads with the conventional bead size distribution and/or with broken particles with jagged edges are susceptible to tight particle packing resulting in nonuniform, tortuous channels in the bed. This can result in high shear conditions in the bed, increasing the risk of coagulation of the dispersion. With conventional anion exchange resins in fixed beds, long treatment times are therefore required and care much be taken to prevent coagulation, especially with high solids content dispersions, i.e., greater then 25% solids.

BRIEF SUMMARY OF THE INVENTION

The present invention provides a process for reducing fluorosurfactant content of a stabilized fluorosurfactant-containing aqueous fluoropolymer dispersion comprising passing said stabilized fluorosurfactant-containing aqueous fluoropolymer dispersion through a fixed bed of ion exchange resin beads comprising a polymer and functional groups to reduce fluorosurfactant content, the ion exchange resin beads being monodisperse.

Because the resin beads are monodisperse, the invention provides more uniform channel size and thus a less tortuous path for the disperion through the ion exchange bed. Less pressure drop occurs across the bed enabling higher flow rates and lower extraction times and the process is amenable to treat high solids content fluoropolymer dispersions.

DETAILED DESCRIPTION OF THE INVENTION

Fluoropolymer Dispersion

The stabilized fluorosurfactant-containing aqueous fluoropolymer dispersion for treatment in accordance with the present invention is made by dispersion polymerization (also known as emulsion polymerization). The aqueous fluoropolymer dispersion is a stabilized fluorosurfactant-containing aqueous fluoropolymer dispersion which means that it contains sufficient nonionic surfactant to prevent coagulation of the dispersion when the fluorosurfactant content is reduced. As will be explained in more detail hereinafter, depending upon when the process of the invention is employed, the nonionic surfactant may already be present or may be added for stabilization prior to treatment according to the invention. After concentration, aqueous fluoropolymer dispersions are useful as in coating or impregnating compositions and to make cast films.

Fluoropolymer dispersions are comprised of particles of polymers made from monomers wherein at least one of the monomers contains fluorine. The fluoropolymer of the particles of the aqueous dispersions used in this invention is independently selected from the group of polymers and copolymers of trifluoroethylene, hexafluoropropylene, monochlorotrifluoroethylene, dichlorodifluoroethylene, tetrafluoroethylene, perfluoroalkyl ethylene monomers, perfluoro(alkyl vinyl ether) monomers, vinylidene fluoride, and vinyl fluoride.

The invention is especially useful when the fluoropolymer component of the dispersion is polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 weight %, more preferably less than 0.5 weight %. The modified PTFE contains a small amount of comonomer modifier which improves film forming capability during baking (fusing), such as perfluoroolefin, notably hexafluoropropylene (HFP) or perfluoro (alkyl vinyl) ether (PAVE), where the alkyl group contains 1 to 5 carbon atoms, with perfluoro(ethyl vinyl) ether (PEVE) and perfluoro(propyl vinyl) ether (PPVE) being preferred.

Chlorotrifluoroethylene (CTFE), perfluorobutyl ethylene (PFBE), or other monomer that introduces bulky side groups into the molecule are also included. The PTFE typically has a melt creep viscosity of at least $1 \times 10^9$ Pa·s. Such high melt viscosity indicates that the PTFE does not flow in the molten state and therefore is not melt-processible. PTFE and modified PTFE are frequently sold in dispersion form and transported in shipping containers and the process of the invention can be readily employed for reducing the fluorosurfactant content of such dispersions.

The fluoropolymer component of the dispersion may be melt-processible. By melt-processible, it is meant that the polymer can be processed in the molten state (i.e., fabricated from the melt into shaped articles such as films, fibers, and tubes etc. that exhibit sufficient strength and toughness to be useful for their intended purpose). Examples of such melt-processible fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Such fluoropolymers include polychlorotrifluoroethylene, copolymers of tetrafluoroethylene (TFE) or chlorotrifluoroethylene (CTFE). Preferred comonomers with of TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The melt-processible copolymer is made by incorporating an amount of comonomer into the copolymer in order to provide a copolymer which typically has a melt flow rate of about 1-100 g/10 min as measured according to ASTM D-1238 at the temperature which is standard for the specific copolymer. Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Additional melt-processible fluoropolymers are the copolymers of ethylene or propylene with TFE or CTFE, notably ETFE, ECTFE and PCTFE. Further useful polymers are film forming polymers of polyvinylidene fluoride(PVDF) and copolymers of vinylidene fluoride as well as polyvinyl fluoride (PVF) and copolymers of vinyl fluoride.

A typical process for the aqueous dispersion polymerization of preferred polymer PTFE is a process wherein TFE vapor is fed to a heated reactor containing fluorosurfactants, paraffin wax and deionized water. If desired, a chain transfer agent may be added to reduce the PTFE molecular weight. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and polymer dispersion is transferred to a dispersion concentration operation which produces stabilized dispersions which are useful for the practice of the present invention. In the dispersion concentration operation, the dispersion is concentrated with the aid of a nonionic surfactant as taught in Marks et al., U.S. Pat. No. 3,037,953, and in Holmes, U.S. Pat. No. 3,704,272 to raise the solids from nominally 35 wt % to about 60 wt %. Miura et al., U.S. Pat. No. 6,153,688 discloses a similar process. Aromatic alcohol ethoxylates can be used as the nonionic surfactant but, because there is concern about possible environmental harm from aromatic compounds, preferred nonionic surfactants are aliphatic alcohol ethoxylates. Suitable nonionic surfactants include any of a variety of aliphatic alcohol ethoxylates or mixtures thereof which provide the desired cloud point during concentration and which provide desired properties in the dispersion, e.g., low burn off temperature, dispersion stability, etc. Especially preferred nonionic surfactants are a compound or mixture of compounds of the formula:

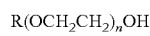

$$R(OCH_2CH_2)_nOH$$

wherein R is a branched alkyl, branched alkenyl, cycloalkyl, or cycloalkenyl hydrocarbon group having 8-18 carbon atoms and n is an average value of 5 to 18.

Concentrated dispersions containing nonionic surfactant made as described above thus are stabilized fluorosurfactant-containing dispersions suitable for use in the practice of the present invention.

The dispersion polymerization of melt-processible TFE copolymers is similar except that one or more comonomers are added to the batch initially and/or introduced during polymerization. In addition, a telogen such as a hydrocarbon is employed to control the molecular weight to achieve the desired melt flow of the polymer for the intended purpose. The same dispersion concentration operation performed with the aid a nonionic surfactant as used for PTFE dispersions can be used for TFE copolymer dispersions.

Stabilized fluorosurfactant-containing dispersions suitable for use in the practice of the present invention can be made prior to concentration by adding nonionic surfactants to raw dispersion (after wax removal referred to above). It is desirable to use the same nonionic surfactants that will be used for concentration and nonionic surfactants for this purpose are described above. Nonionic surfactant is typically added to the raw dispersion under mild agitation conditions in the approximately the same concentrations as is used for concentration, about 2 to about 11% based on the weight of fluoropolymer solids in the dispersion.

Stabilized fluorosurfactant-containing fluoropolymer dispersions with solids content of about 15 to about 70 wt % are advantageously treated in accordance with the invention. Preferably, the solids content is at least about 25 wt %, more preferably at least about 30 wt %, and most preferably at least about 35 wt %.

Fluorosurfactants

The fluorosurfactant in the fluorosurfactant-containing dispersions to be reduced in this process is a non-telogenic, anionic dispersing agent, soluble in water and comprising an anionic hydrophilic group and a hydrophobic portion. Preferably, the hydrophobic portion is an aliphatic fluoroalkyl group containing at least four carbon atoms, all except at most one of which, and that one the closest to the solubilizing group, bearing at least two fluorine atoms, the terminal carbon atom bearing in addition an atom consisting of hydrogen or fluorine. These fluorosurfactants are used as a polymerization aid for dispersing and because they do not chain transfer, they do not cause formation of polymer with undesirable short chain length. An extensive list of suitable fluorosurfactants is disclosed in U.S. Pat. No. 2,559,752 to Berry. Preferably, the fluorosurfactant is a perfluorinated carboxylic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed.

Ion Exchange Resins

The ion exchange resins for use in accordance with the present invention include anionic resins but can also include other resin types such as cationic resins, e.g., in a mixed bed. The anionic resins employed can be either strongly basic or weakly basic. Suitable weakly basic anion exchange resins contain primary, secondary amine, or tertiary amine groups. Suitable strongly basic anion exchange resin contain quaternary ammonium groups. Although weakly basic resins are useful because they can be regenerated more easily, strongly basis resins are preferred when it is desired to reduce fluorosurfactant to very low levels and for high utilization of the resin. Strongly basic ion exchange resins also have the advantage of less sensitivity to the pH of the media. Strong base anion exchange resins have an associated counter ion and are typically available in chloride or hydroxide form but are readily converted to other forms if desired. Anion exchange resins with hydroxide, chloride, sulfate, and nitrate can be used for the removal of the fluorosurfactant but anion exchange resins in the form of hydroxide are preferred to prevent the introduction of additional anions and to increase pH during anion exchange because a high pH, i.e., greater than 9, is desirable in the product prior to shipping to inhibit bacterial growth. Examples of suitable commercially-available strong base anion exchange resins with quaternary ammonium groups with a trimethylamine moiety include DOWEX® 550A, US Filter A464-OH, SYBRON M-500-OH, SYBRON ASB1-OH, PUROLITE A-500-OH, Itochu TSA 1200, AMBERLITE® IR 402. Examples of suitable commercially-available strong base anion exchange resins with quaternary ammonium groups with a dimethyl ethanol amine moiety include US Filter A244-OH, AMBERLITE® 410, DOWEX® MARATHON A2, and DOWEX® UPCORE Mono A2.

Ion exchange resin used in the process of the present invention is monodisperse. Preferably, the ion exchange resin beads have a number average size distribution in which 95% of the beads have a diameter within plus or minus 100 μm of the number average bead diameter.

The monodisperse ion exchange resin has a particle size which provides a suitable pressure drop through the bed. As discussed previously, very large beads are fragile and prone to breakage. Very small ion exchange beads are susceptible to tight particle packing resulting in tortuous channels in the bed. This can result in high shear conditions in the bed. Preferred ion exchange resin has a number average bead size about 450 to about 800 μm, more preferably, the ion exchange resin beads have a number average bead diameter of about 550 to about 700 μm.

Process

The present invention permits reducing the fluorosurfactant content of a fluorosurfactant-containing dispersion to a predetermined level, preferably a level no greater than about 300 ppm, more preferably a predetermined level no greater than about 100 ppm, especially a predetermined level no greater than about 50 ppm.

Passing the dispersion through a fixed bed of the ion exchange resin with the dispersion can occur before or after concentration but typically the lower solids material before concentration is easier to process. If the process is carried out prior to concentration, nonionic surfactants are added prior to contact with the ion exchange resin as discussed above.

Known apparatus such as an ion exchange column can be used to pass the dispersion through the ion exchange resin to carrying out ion exchange of the process. Flow can be upward or downward through the bed.

The fluorosurfactant can be recovered from the ion exchange resin if desired or the resin with the fluorosurfactant can be disposed of in an environmentally acceptable method, e.g., by incineration. If it is desired to recover the fluorosurfactant, the fluorosurfactant may be removed from resin by elution. Elution of fluorosurfactant adsorbed on the anion exchange resin is readily achieved by use of ammonia solution as demonstrated by Seki et al in U.S. Pat. No. 3,882,153; by a mixture of dilute mineral acid with organic solvent (e.g., HCl/ethanol) as demonstrated by Kuhls in U.S. Pat. No. 4,282,162; or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, or other methods of concentration, etc.

In addition to providing improved flow through the bed, monodisperse resins are more uniformly utilized, i.e., all of the beads in a localized region will be saturated at the same time, facilitating full utilization of the bed. Similarly, when elution is desired to regenerate the bed, monodisperse beads will perform more uniformly in elution process, minimizing the use of treatment chemical and regeneration time.

What is claimed is:

1. A process for reducing fluorosurfactant content of a stabilized fluorosurfactant-containing aqueous fluoropolymer dispersion comprising:

passing said stabilized fluorosurfactant-containing aqueous fluoropolymer dispersion through a fixed bed of ion exchange resin beads comprising a polymer and functional groups to reduce fluorosurfactant content, said ion exchange resin beads being monodisperse.

2. The process of claim 1 wherein said ion exchange resin beads have a number average size distribution in which 95% of the beads have a diameter within plus or minus 100 μm of the number average bead diameter.

3. The process of claim 1 wherein said ion exchange resin beads have a number average bead diameter of about 450 to about 800 μm.

4. The process of claim 1 wherein said ion exchange resin beads have a number average bead diameter of about 550 to about 700 μm.

5. The process of claim 1 wherein said stabilized dispersion has a solids content of at least about 25 wt %.

6. The process of claim 1 wherein said stabilized dispersion has a solids content of at least about 30 wt %.

7. The process of claim 1 wherein said stabilized dispersion has a solids content of at least about 35 wt %.

8. The process of claim 1 wherein said ion exchange resin comprises anion exchange resin.

9. The process of claim 8 wherein said functional groups of said resin are selected from the group comprising primary amine, secondary amine, tertiary amine, and quaternary ammonium groups.

10. The process of claim 8 wherein said anion exchange resin comprises quaternary ammonium groups.

11. The process of claim 8 wherein said anion exchange resin is in the hydroxide form.

12. The process of claim 1 wherein said passing of said stabilized fluorosurfactant-containing aqueous fluoropolymer dispersion through a fixed bed of ion exchange resin reduces fluorosurfactant content to a predetermined level of no greater than about 300 ppm.

13. The process of claim 1 wherein said passing of said stabilized fluorosurfactant-containing aqueous fluoropolymer dispersion through a fixed bed of ion exchange resin reduces fluorosurfactant content to a predetermined level of no greater than about 100 ppm.

14. The process of claim 1 wherein said passing of said stabilized fluorosurfactant-containing aqueous fluoropolymer dispersion through a fixed bed of ion exchange resin reduces fluorosurfactant content to a predetermined level of no greater than about 50 ppm.

* * * * *

UNITED STATES PATENT AND TRADEMARK OFFICE
CERTIFICATE OF CORRECTION

PATENT NO. : 7,659,329 B2  Page 1 of 1
APPLICATION NO. : 11/292459
DATED : February 9, 2010
INVENTOR(S) : Swearingen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1020 days.

Signed and Sealed this

Thirtieth Day of November, 2010

David J. Kappos
*Director of the United States Patent and Trademark Office*